(12) United States Patent  
Karr

(10) Patent No.: US 9,043,990 B2  
(45) Date of Patent: Jun. 2, 2015

(54) PET TOILET

(71) Applicant: Nancy Karr, Lindenhurst, IL (US)

(72) Inventor: Nancy Karr, Lindenhurst, IL (US)

( * ) Notice: Subject to any disclaimer, the term of this patent is extended or adjusted under 35 U.S.C. 154(b) by 0 days.

(21) Appl. No.: 14/305,564

(22) Filed: Jun. 16, 2014

(65) Prior Publication Data

US 2015/0075437 A1 Mar. 19, 2015

Related U.S. Application Data

(60) Provisional application No. 61/878,655, filed on Sep. 17, 2013, provisional application No. 61/835,817, filed on Jun. 17, 2013.

(51) Int. Cl.
*A01K 29/00* (2006.01)
*A01K 1/01* (2006.01)

(52) U.S. Cl.
CPC .................................. *A01K 1/011* (2013.01)

(58) Field of Classification Search
CPC ... A01K 1/0107; A01K 1/0121; A01K 1/011; A01K 1/0114; A47K 11/03
See application file for complete search history.

(56) References Cited

U.S. PATENT DOCUMENTS

| | | | | | |
|---|---|---|---|---|---|
| 1,813,329 | A | * | 7/1931 | Supplee | 119/161 |
| 4,117,555 | A | * | 10/1978 | Dennis | 119/163 |
| 5,003,920 | A | * | 4/1991 | Miksitz | 119/163 |
| 5,458,090 | A | * | 10/1995 | Favreau | 119/163 |
| 6,263,834 | B1 | * | 7/2001 | Igual De Valles | 119/166 |
| 2008/0178817 | A1 | * | 7/2008 | Brewer | 119/163 |

* cited by examiner

*Primary Examiner* — Kristen C Hayes
(74) *Attorney, Agent, or Firm* — Husch Blackwell LLP

(57) ABSTRACT

A litter-based flush toilet for cats based on a modified flushing rim commercial service sink made of vitreous china equipped with an added moveable drain plug. The sink tramway is modified to lower the water level below the level of the drain plug, resulting in a dry bowl between flushes. The plug prevents flushable biodegradable litter from prematurely entering the drain and provides a safety factor for inquisitive digging cats. The commercial plumbing version has a conventional commercial flushing valve and lever, either hand or foot operated. The residential version has an oversized conventional toilet tank complete with flush handle and flapper valve. To flush, the pet owner activates the actuator to dislodge the cover from the drain and flushes the pet waste and absorbent material down the drain. The user then replaces the plug and refills the bowl with about an inch of fresh litter.

12 Claims, 5 Drawing Sheets

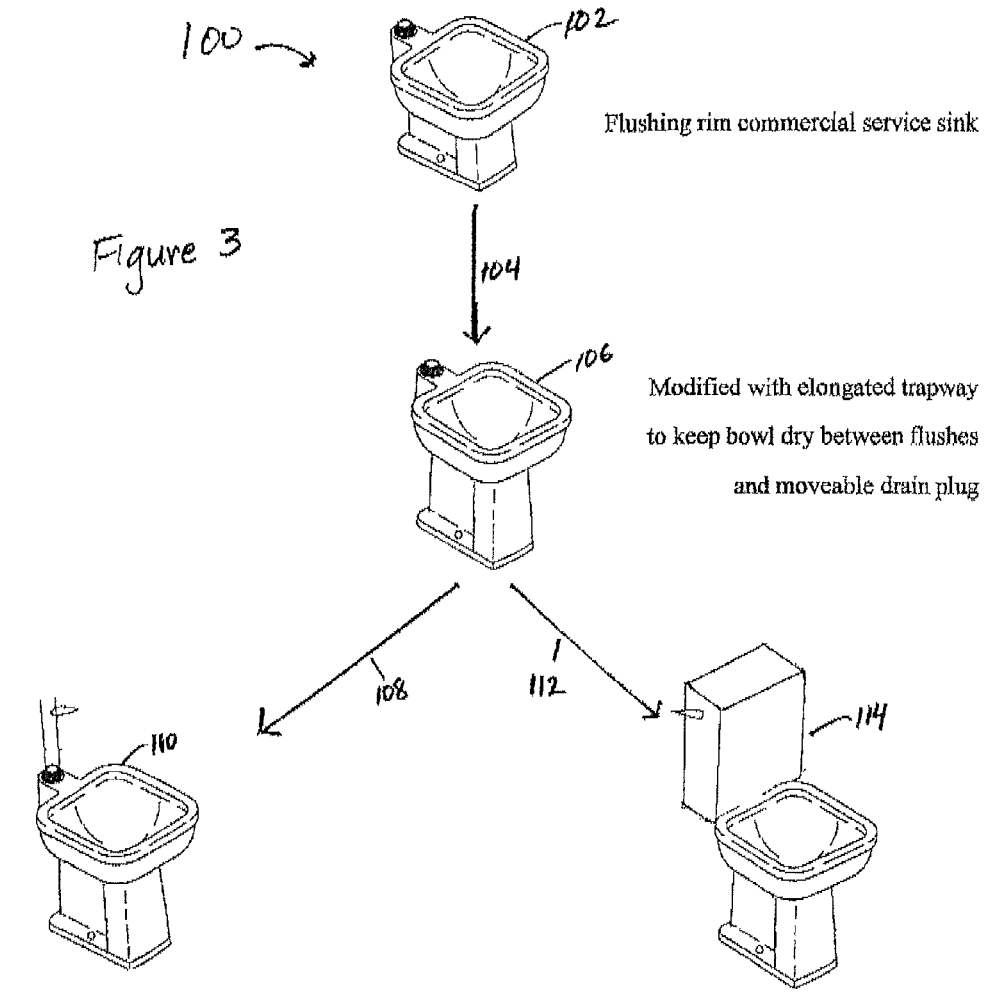

Pet Toilet Flow Chart

Figure 3

- 100
- 102 Flushing rim commercial service sink
- 104
- 106 Modified with elongated trapway to keep bowl dry between flushes and moveable drain plug
- 108
- 110
- 112
- 114

Commercial applications

Accommodates all commercial:

- Flush handles/pedals (required)
- Faucets and faucet handles (optional)
- Sprayers with flexible hose (optional)

Residential applications

- Add large toilet tank with flush handle and flapper va
- Requires T connection to water line to add accessorie
- Other existing residential flush technologies may be u Experiments show that compressed sawdust litter works best for flushing of all biodegradable litters tested.

PET TOILET

This application claims the benefit of the filing date of U.S. Provisional Application Ser. No. 61/835,817 filed Jun. 17, 2013, entitled, "Kitty-Whiz" and the filing date of U.S. Provisional Application No. 61/878,655 filed on Sep. 17, 2013, entitled "Pet Toilet." The '817 and '655 applications are hereby incorporated herein by reference.

FIELD

This application is directed to pet products and more particularly to methods of disposing of pet waste.

BACKGROUND

Systems are known to dispose of pet waste. Such systems are typically based upon the use of mechanical devices to retrieve and transport waste to a disposal container.

One very basic system for disposing of pet waste involves the use of a plastic bag. In this case, the owner inserts his/her hand inside the plastic bag and uses the plastic bag as a glove to manually pick up the solid pet waste from the ground. The person then inverts the bag around the waste and drops the bag and waste into a disposal container. While this system is simple and effective, some people find this process to be distasteful.

Another system involves the use of a small shovel and broom. In this case, the user simply uses the broom to sweep the waste onto the shovel. Once on the shovel, the user then dumps the waste directly from the shovel into a waste container.

However, the shovel often retains pet waste on the surface of the shovel especially if the waste is fresh. Accordingly, the shovel and broom may need to be cleaned before storage and reuse.

Alternatively, a person may simply place a container (i.e., a litter box) filled with a granular material within their home. This type of system takes advantage of the fact that cats have a natural tendency to bury their waste. However, the container must still be periodically cleaned to remove and dispose of the pet waste.

In general, the handling of pet waste is unsanitary and dangerous. Accordingly, a need exists for better methods of disposing of pet waste.

BRIEF DESCRIPTION OF THE DRAWINGS

FIG. 3 is a flow chart that shows processes associated with providing the pet toilet;

DETAILED DESCRIPTION

Figure 1:
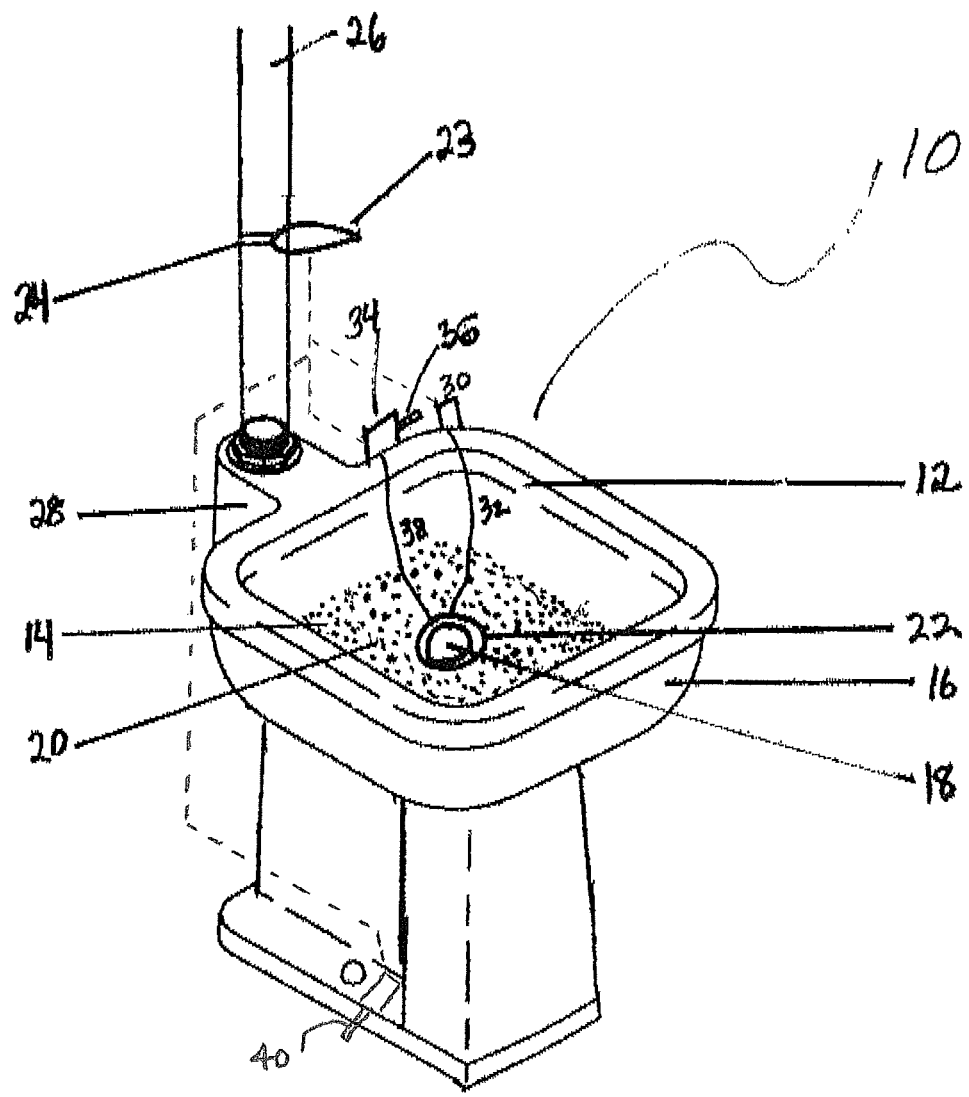
FIG. 1 illustrates a simplified view of a pet toilet in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

FIG. 1 is a simplified drawing of a flushing pet toilet 10 shown generally in accordance with an illustrated embodiment. The pet toilet may be constructed using a service or flushing sink 12. The sink includes a set of side walls 16 and a generally flat floor 14. Located on the flat floor is a drain 18.

Under one illustrated embodiment, the floor of the sink is covered with a granular material 20. The granular material may be an absorbent material (e.g., saw dust, saw dust pellets, etc.) that covers the floor to a depth of about 1 inch. The granular material takes advantage of the natural tendency of a cat to bury its waste.

A cover 22 is located over the drain to reduce the amount of absorbent material that may be lost down the drain. For example, as a cat buries its waste, the cat's digging could cause significant amounts of material to inadvertently fall down the drain.

The pet toilet may also include a flush control device 23 that flushes the pet waste down the drain. The flush control device may include a water valve 24 that is opened by the actuator to allow water from a water source 26 to flow into the sink via a discharge 28. The flush control device may also include a cover actuator 30 that operates through a coupling element 32 to temporarily dislodge the cover from the cover's normal position where it blocks the drain. The flush control device may be controlled via a user activated device 34.

The user device may be mounted adjacent the floor and may include a foot activated device (e.g., a foot pedal) 40. Alternatively, the user device may be located above the top of the walls of the sink and be a hand operated device (e.g., a hand lever).

The flush control device may be mechanically or electrically operated. Where electrically operated, the water valve may be solenoid operated valve. Similarly, the cover actuator may be a solenoid that operates to temporarily move the cover away from the drain against the force of a spring that returns the cover to the drain after the solenoid is deactivated. The user device may be an electrical switch activated by a pushbutton or lever 36.

Where mechanically operated, the user device may be coupled to the flush control device via a cable 38. In this case, the user activates the foot pedal or hand lever and the cable opens the valve and moves the cover out of the way. When the user releases the user device the valve closes and the cover returns to cover the drain.

Figure 2:
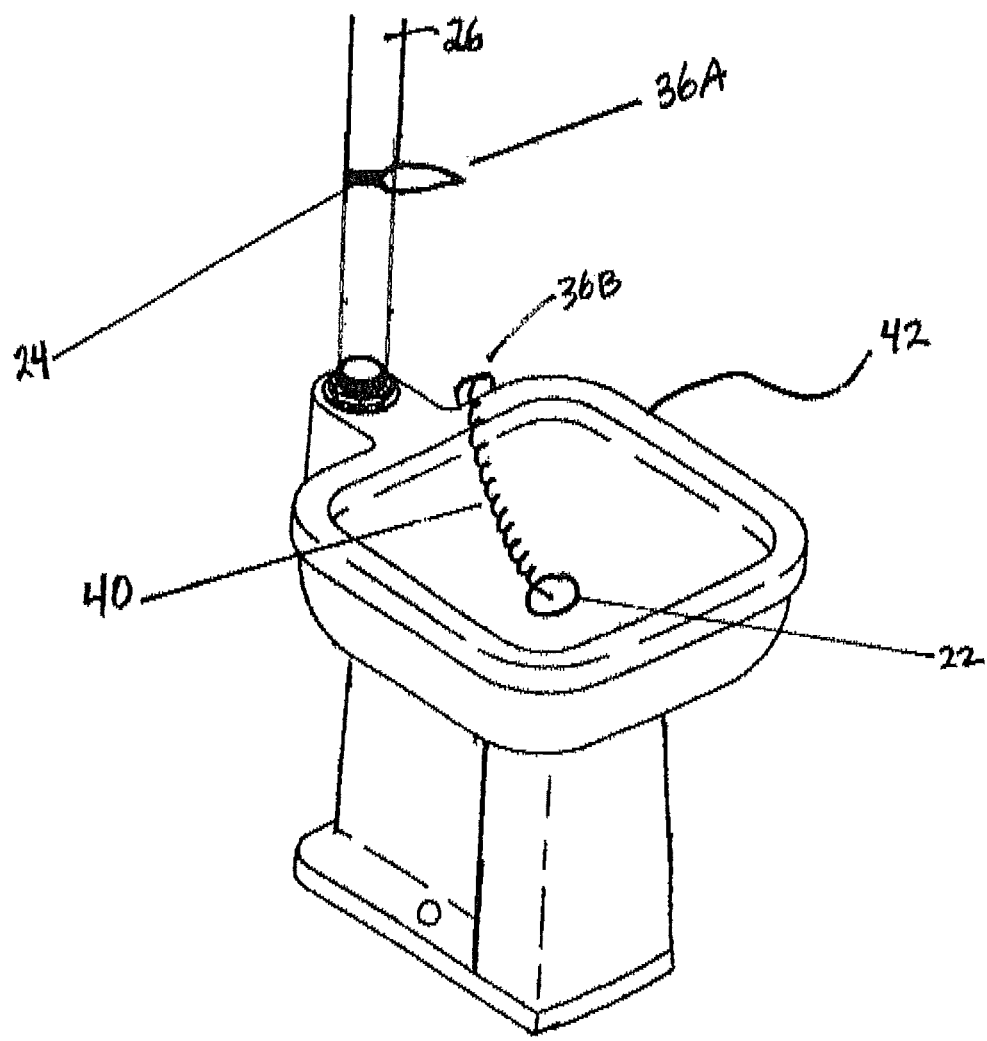
FIG. 2 depicts the pet toilet of FIG. 1 under an alternate embodiment.

Under another embodiment illustrated in FIG. 2, the flush control device may include two user activated devices 36A, 36B. In this case, the first user activated device 36A may be used to mechanically activate the water valve 24 and the second user activated device 36B may be mechanically coupled to the cover via a cable 40.

In this embodiment, the user may first grasp the second user activated device with his/her hand and pull the cover away from the drain. The user may then activate the first user activated device to open the valve. Once the flush is complete, the user may manually replace the cover over the drain and replace the granular material on the floor of the sink.

Under another illustrated embodiment, the discharge from the water valve may be coupled to a manifold 42 that encircles the sink below an upper lip of the side walls. The manifold may include a number of apertures along its length to discharge water into the sink at predetermined intervals (e.g., every one inch) along the periphery of the manifold.

The pet toilet is believed to be particularly effective for felines. For example, cats have been found to learn from other cats with regard to the use of litter trays. Cats don't use conventional toilets because the toilet normally holds water, not litter. The pet toilet of FIGS. 1 and 2 combines a cat's tendency to bury waste in litter with directed sanitary disposal via a municipal sewage system or septic field.

The pet toilet may be based upon a custom designed sink or upon a modification and re-purposing of a large commercial service sink (floor mount or wall mount) that already has a flushing rim. A regular toilet may also be modified but it may be too small for some cats. The flush valve can be manually or foot activated and the sink can be installed at any desired height. The inside bottom of the sink is nearly flat. The sink is built to commercial standards of 25 psi minimum water pressure required to supply adequate water pressure to buildings more than 3 stories high. There is no tank like a residential toilet has and the flush volume is 6.5 gallons unless a dual flush valve is used to conserve water. American Standard and Kohler, for example, make this type of commercial sink.

In general, after the cat exits the toilet, the owner flushes the litter and waste. This can be done by activating a flush valve. With the water evacuated, clean litter is added. Flushing can be done daily or as needed to control odors. The pet toilet may be cleaned periodically with conventional toilet bowl cleaners followed by a flush to rinse.

In other cases, the sink trapway below the sink may be modified to lower the water level below the level of the drain plug, resulting in a dry bowl between flushes. This can be done by raising the sink above the trap by the addition of a short pipe or connector between the trap and bottom of the sink.

The increasing popularity of cats and multi-bathroom homes as well as advances in flush technology and biodegradable litter make the pet toilet an idea whose time has come. The pet toilet is suitable for residential or commercial use. In a pet shelter, it may be installed in rooms housing multiple cats. In residential applications, it can replace one toilet in a multi-bathroom home since it is about the same depth from the wall as a conventional toilet. It can be plumbed into a home utility or laundry room, possibly replacing an unneeded sink if space is a consideration. It can be installed in a basement roughed-in for an extra bathroom without the expense of a full bathroom. The high powered commercial flush is not necessary in low-rise residential applications, so the lack of commercial compressive fittings is not an issue and the flush volume can be reduced.

The pet toilet of FIGS. 1 and 2 offers a number of advantages over conventional pet waste clean-up and disposal. First, the pet toilet eliminates scooping litter and pet waste from litter containers and scrubbing of a litter box. Second, the more frequent disposal of waste reduces odors and prevents ammonia formation. The pet toilet diverts animal waste and litter from landfills into the proper sewage treatment centers. The use of biodegradable wheat, corn or pine litter is lighter and easier to handle than inorganic clay litters that are often used in conventional litter boxes. The frequent flushing of the pet toilet can reduce the spread of disease in shelters where litter boxes are shared among a number of pets. The pet toilet does not require training of a cat because of the natural tendency of cats to bury waste. Other small pets can be separately trained to use the pet toilet. The use of a pet toilet has the potential to reduce feline homelessness, since people often cite cleaning up after a pet as a reason not to get or keep a cat. An optional spray hose attached to the incoming water line of the sink may allow the pet toilet to be easily cleaned. The optional spray hose may also be used for rinsing the removable floor pan of bird cages or other small animal enclosures. The use of the pet toilet reduces concerns about transmission of diseases to humans (e.g., toxoplasmosis, etc.).

FIG. 3 illustrates the process 100 of providing a pet toilet under one illustrated embodiment. For example, the user may begin with a flushing rim commercial service sink 102. The flushing rim sink may be modified 104 by elongating the trapway and adding a removable drain plug to provide a basic pet toilet 106. In commercial applications, the user may add 108 a flush handle and/or a flushing pedal to provide a working pet toilet 110. Optionally, the user may optionally add faucets and faucet handles to be used in conjunction with the pet toilet, such as for filling a container for cleaning the bowl of the pet toilet. Optionally, the user may also add sprayers with flexible hoses to better clean the bowl.

Alternatively, the user may make other modifications 112 to adapt the pet toilet for residential applications 114. For example, the user may add a large toilet tank and flapper valve controlled by the toilet handle. A "tee" connection may be added to the water supply line for added accessories such as water faucets or sprayers. Other existing residential flush technologies may also be used.

Any of a number of different biodegradable litters may be used in conjunction with the pet toilet of FIG. 3. For example, a litter of compressed sawdust pellets has been found to provide the best results.

In general, the pet toilet is a sink/toilet hybrid that requires an unobstructed trapway, like a toilet, but may also need a drain plug like a sink. The drain plug actuator mechanism differs from sink and tub mechanisms in the need to keep the trapway free of obstructions that would otherwise interfere with the disposal of litter and solid waste.

The bowl area should be free of protrusions that would otherwise interfere with the cat's use of the facility. Additionally, the plug needs to be something that the cat cannot dislodge by pawing or digging. An unobstructed secondary dry trapway curve between the bowl and the P-trap could provide the needed functionality but would be unsafe for inquisitive cats because of the possible entrapment of the cat.

Two possible solutions may be used. One solution provides a plug that is accessible from below the bowl's floor because it keeps the bowl free from obstructions and the other solution is accessible from above the bowl's floor with the first solution being the preferred embodiment.

Figure 4:
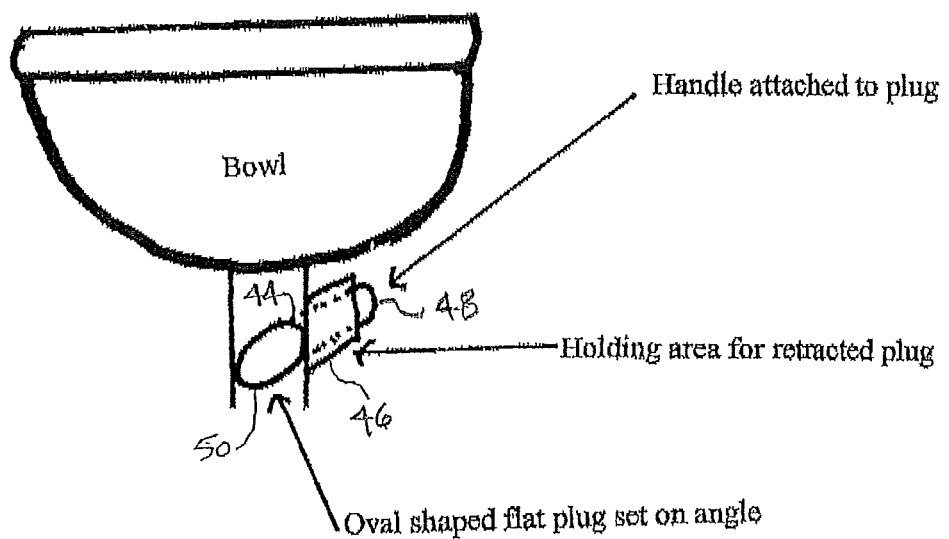
FIG. 4 depicts a plug that may be used with the pet toilet of FIG. 1.

FIG. 4 depicts the solution where the plug is accessible from below the bowl's floor. In this case, the plug 50 is an oval-shaped flat plug inserted on an angle into a pipe of the trapway below the bowl floor and above the P-trap. In this case, a slot 44 is cut on an angle through approximately one-half of the pipe's circumference at the upper edge of the plug's blocking location. An enclosure 46 may extend upwards from the slot with a small hole at the top of the enclosure for an actuating device (e.g., a handle). The enclosure may form a waterproof seal with the slot and around the small top hole. The small hole allows the plug to be retracted via the handle into a holding area incorporated into the enclosure. The slot may have a squeegee type edge on opposing sides of the slot to prevent water or other material from entering the holding area.

To flush, the user may actuate the flushing mechanism (e.g., pull the handle) to move the plug into the holding area. The user next flushes the pet toilet and then pushes the handle back into place. Lastly, the user adds fresh litter.

The vitreous china of the bowl may be provided with an increased thickness adjacent the slot to strengthen the slotted pipe. No adjustment is necessary to the size of the interior lumen of the trapway. The holding area has a user accessible (removable) opening on top with a waterproof gasket to allow for occasional cleaning of the holding area.

Figure 5:
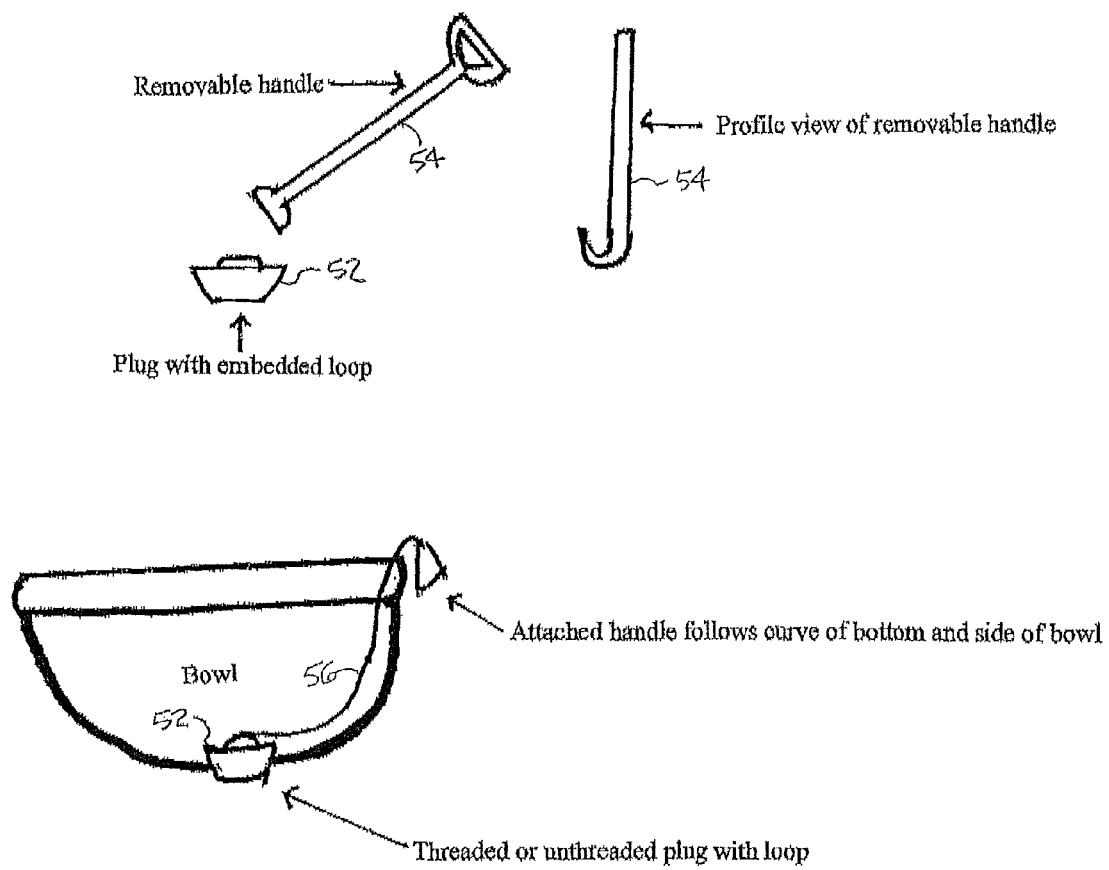
FIG. 5 depicts plug removal apparatus that may be used with the device of FIG. 1.

FIG. 5 depicts details of an arrangement where the plug 52 can be installed from above. The drain plug mechanism that operates from above can include a removable or fixed handle 54 and threaded or unthreaded plug. A plug attached to a simple chain is undesirable because of the need to touch the plug and put one's hand in the bowl to replace the plug. Therefore, a fairly rigid strip of flat metal may be used to place the plug into an operable position. The tapered plug has an embedded metallic flattened loop on an upper surface that one grasps with the wide flattened hook on the far end of the handle. An inflexible plug with one-quarter turn threading requires threading into the top of the drain, but a flexible unthreaded silicone or plastic plug does not. A cat would not be able to dislodge a threaded plug. The disadvantage of the removable handle is that the user is required to fish for the hook under the litter to remove the plug in order to flush. A fixed handle 56 pivoting on the plug hook resolves this problem; it follows the curve of the bowl to stay out of the way and is flexible enough near the handle end to hook over the lip of the bowl.

In general, the pet toilet may include a service sink having a relatively flat floor, a wall that surrounds the floor, a flush valve and a drain, a granulated absorbent material that covers the floor, a cover that covers the drain and prevents the absorbent material from entering the drain, a discharge that discharges water from the flush valve onto an inside surface of the walls of the sink and an actuator that dislodges the cover from the drain and activates the flush valve wherein upon discharge of waste by a pet into the absorbent material, a user activates the actuator to dislodge the cover from the drain and to flush the waste and absorbent material down the drain.

Alternatively, the pet toilet may include a service sink having a relatively flat floor, a wall that surrounds the floor, a flush valve and a drain, a granulated absorbent material that covers the floor, a cover that covers the drain and prevents the absorbent material from entering the drain, a discharge that discharges water from the flush valve onto an inside surface of the walls of the sink and a flush mechanism that dislodges the cover from the drain and activates the flush valve wherein upon discharge of waste by a pet into the absorbent material, a user activates the flush mechanism to dislodge the cover from the drain and to flush the waste and absorbent material down the drain.

Alternatively, the pet toilet may include a service sink having a relatively flat floor, a wall that surrounds the floor, a flush valve and a drain, a granulated absorbent material that covers the floor, a cover that covers the drain and prevents the absorbent material from entering the drain, a chain or cord that connects to the cover on a first end and to an attachment above the wall of the sink on a second end and a manifold that discharges water from the flush valve onto an inside surface of the walls of the sink wherein upon discharge of waste by a pet into the absorbent material, a user first activates the chain or cord to dislodge the cover from the drain and then the flush valve to flush the waste and absorbent material down the drain.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. An apparatus comprising:
    a service sink having a relatively flat floor, a wall that surrounds the floor, a flush valve and a drain;
    a granulated absorbent material that covers the floor;
    a cover that covers the drain and prevents the absorbent material from entering the drain;
    a discharge that discharges water from the flush valve onto an inside surface of the walls of the sink; and
    an actuator that dislodges the cover from the drain and activates the flush valve wherein upon discharge of waste by a pet into the absorbent material, a user activates the actuator to dislodge the cover from the drain and to flush the waste and absorbent material down the drain.

2. The apparatus as in claim 1 wherein the actuator further comprises a chain attached on a first end to the cover plate.

3. The apparatus as in claim 2 further comprising a handle connected to the a second end of the chain.

4. The apparatus as in claim 3 further comprising a second handle coupled to the flush valve.

5. An apparatus comprising:
    a service sink having a relatively flat floor, a wall that surrounds the floor, a flush valve and a drain;
    a granulated absorbent material that covers the floor;
    a cover that covers the drain and prevents the absorbent material from entering the drain;
    a discharge that discharges water from the flush valve onto an inside surface of the walls of the sink; and
    a flush mechanism that dislodges the cover from the drain and activates the flush valve wherein upon discharge of waste by a pet into the absorbent material, a user activates the flush mechanism to dislodge the cover from the drain and to flush the waste and absorbent material down the drain.

6. The apparatus as in claim 5 wherein the flush mechanism further comprises a float that dislodges the cover from the drain as water from the flush valve fills the service sink.

7. The apparatus as in claim 5 wherein the flush mechanism further comprises a foot pedal.

8. An apparatus comprising:
    a service sink having a relatively flat floor, a wall that surrounds the floor, a flush valve and a drain;
    a granulated absorbent material that covers the floor;
    a cover that covers the drain and prevents the absorbent material from entering the drain;
    a chain or cord that connects to the cover on a first end and to an attachment above the wall of the sink on a second end; and
    a manifold that discharges water from the flush valve onto an inside surface of the walls of the sink wherein upon discharge of waste by a pet into the absorbent material, a user first activates the chain or cord to dislodge the cover from the drain and then the flush valve to flush the waste and absorbent material down the drain.

9. The apparatus as in claim 8 wherein the service sink further comprises a flush sink.

10. The apparatus as in claim 8 further comprising a foot actuator that activates the flush valve.

11. The apparatus as in claim 8 further comprising a cover actuator that dislodges the cover from the drain.

12. The apparatus as in claim 8 further comprising a handle that concurrently activates the flush valve and cover actuator.

* * * * *